(12) United States Patent
Keramane

(10) Patent No.: US 7,890,082 B1
(45) Date of Patent: Feb. 15, 2011

(54) METHOD AND APPARATUS FOR BILLING TELECOMMUNICATIONS SERVICES

(75) Inventor: Cherif Keramane, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 703 days.

(21) Appl. No.: 11/925,255

(22) Filed: Oct. 26, 2007

(51) Int. Cl.
*H04M 11/00* (2006.01)

(52) U.S. Cl. .......................... 455/406; 455/407; 705/34

(58) Field of Classification Search ................ 455/406, 455/407; 705/34
See application file for complete search history.

(56) References Cited

U.S. PATENT DOCUMENTS

| | | | |
|---|---|---|---|
| 6,338,046 B1 * | 1/2002 | Saari et al. ..................... 705/34 |
| 6,658,351 B2 * | 12/2003 | Seto et al. ..................... 701/208 |
| 2005/0164712 A1 * | 7/2005 | Kennedy et al. .......... 455/456.1 |
| 2006/0105759 A1 * | 5/2006 | Betge-Brezetz et al. .. 455/422.1 |
| 2007/0117538 A1 * | 5/2007 | Weiser et al. ................ 455/406 |
| 2009/0061821 A1 * | 3/2009 | Chen et al. ................... 455/411 |
| 2009/0215429 A1 * | 8/2009 | Caldwell et al. ............ 455/406 |

* cited by examiner

*Primary Examiner*—Danh C Le
(74) *Attorney, Agent, or Firm*—Parks IP Law LLC; Jonathan A. Paulis

(57) ABSTRACT

A method for billing wireless telecommunications services based upon density parameters includes determining a cell resolution for a subscriber during a billing period, associating the cell resolution with the subscriber, translating the cell resolution into a set of cells that approximate to of a density map, determining a rating structure for the set, calculating a rating for service rendered to the subscriber based upon the set and the rating structure, and generating a bill reflecting the rating. An apparatus for implementing the above method is also taught.

18 Claims, 2 Drawing Sheets

METHOD AND APPARATUS FOR BILLING TELECOMMUNICATIONS SERVICES

TECHNICAL FIELD

The present invention relates generally to billing systems for telecommunications services and, more particularly, to billing for telecommunications services based upon density parameters.

BACKGROUND

Traditionally, telecommunications services are billed based upon market or sub-market rates and often have a fixed resolution. That is, the rates for markets or sub-markets are based on zip codes, administrative areas, telephony area codes, and the like. These rates are used when billing data is processed to calculate fees for usage of telecommunications services.

The aforementioned billing systems often fail to provide accurate billing for services in all areas within a market or sub-market. Wireless service providers, for example, may have several cell sites in a heavily populated city, but very few sites in rural towns. Unfortunately, many rural subscribers are required to pay the same rates for service that may be less than ideal or at least lesser than the service obtainable for those subscribers that reside in the city. Additionally, from the service provider's perspective, it may be financially beneficial to offer reduced rates for subscribers residing in the rural town to make wireless service a more attractive telecommunications solution.

Thus, the applicant desires to create a need and market for novel methods and a new apparatus to support billing for telecommunications services based upon density parameters.

SUMMARY

One aspect of the present invention is a method for billing wireless telecommunications services based upon density parameters. The method includes determining a cell resolution for a subscriber during a billing period, associating the cell resolution with the subscriber, translating the cell resolution into a set of cells that approximate to the cells defined in the density map, determining a rating structure for the set, calculating a rating for service rendered to the subscriber based upon the set and the rating structure, and generating a bill reflecting the rating.

All methods taught herein can be implemented as computer-executable instructions stored on a non-transitory computer-readable medium that, when executed, perform the steps of the method. For example, an exemplary non-transitory computer-readable medium includes computer-executable instructions that, when executed by a processor, cause the processor to perform acts including receiving a cell resolution for a subscriber. In one embodiment, the cell resolution is determined for a billing period by a geographic broker. The acts further include translating the cell resolution into a set of cells that aggregate at least approximately to cells defined in a density map, determining a rating structure for said set of cells, sending the set of cells and the rating structure to a rating sub-system of a billing system that is in communication with the apparatus so that the billing system can calculate a rating for service rendered to the subscriber based upon the set of cells and the rating structure, and generate a bill reflecting the rating. In one embodiment, the rating structure is an equation including a base rating and at least one density parameter used to determine the rating, the density parameter being derived from the density map.

In one embodiment, the rating structure is an algebraic equation comprising a base rating and at least one density parameter to determine the rating, wherein the density parameter is derived from the density map.

In another embodiment, the service is a voice service and in another embodiment the service is a data service.

In yet another embodiment, the cell resolution includes at least one cell in a Global System for Mobile (GSM) communications network. In this embodiment the density map can be acquired from the GSM association (GSMA).

In still another embodiment, the cell resolution includes at least one cell in a Universal Mobile Telecommunications System (UMTS) communications network.

In another embodiment, the cell resolution includes at least one cell in a Code Division Multiple Access (CDMA) network.

According to another aspect of the present invention, an apparatus for determining rating structures for a subscriber in a wireless telecommunications network is provided. The apparatus includes a service broker, the service broker facilitating communication with a billing system to receive a cell resolution for a subscriber. The service broker can be configured to translate the cell resolution into a set of cells that approximate to the cells defined in the density map; determine a rating structure for the set; and send the rating structure and the set to the billing system.

In one embodiment, the apparatus further includes a density map database for maintenance and retrieval of a plurality of density maps. In a related embodiment, the density map database is capable of receiving and storing updates to the plurality of density maps and updating the density maps.

In another embodiment, the apparatus further includes an adaptive rating criteria engine, the adaptive rating criteria engine being configured to store rating criteria used by the service broker to determine the rating structure appropriate for the set.

In one embodiment, the rating structure is an algebraic equation comprising a base rating and at least one density parameter to determine the rating, wherein the density parameter is derived from the density map.

In another embodiment, the service is a voice service and in another embodiment the service is a data service.

In yet another embodiment, the cell resolution includes at least one cell in a Global System for Mobile (GSM) communications network. In this embodiment the density map can be acquired from the GSM association (GSMA).

In still another embodiment, the cell resolution includes at least one cell in a Universal Mobile Telecommunications System (UMTS) communications network.

In another embodiment, the cell resolution includes at least one cell in a Code Division Multiple Access (CDMA) network.

DETAILED DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
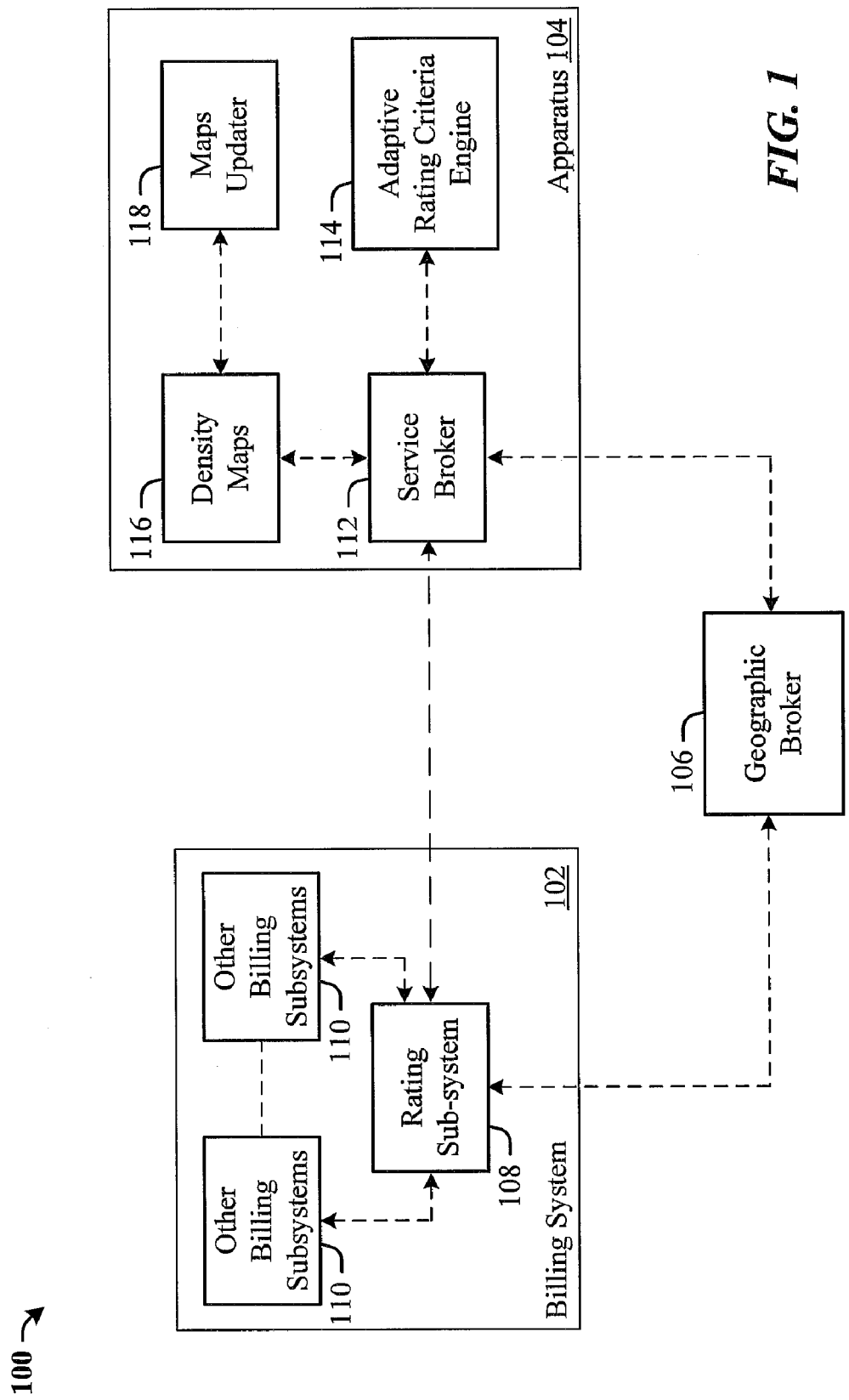
FIG. 1 illustrates an exemplary environment in which the present invention can be implemented.

Referring now to the drawings wherein like numerals represent like elements throughout the several views, FIG. 1 illustrates an exemplary network 100. The illustrated network 100 includes a billing system 102 that is in communication with an apparatus 104, and a geographic broker 106. The illustrated billing system 102 is configured to perform billing functions for services, features, and/or feature sets rendered to customers of a service provider. The exemplary embodiments described herein assume a wireless telecommunications service provider, such as a cellular voice and data service provider, however, other wireless services, such as satellite, and the like are contemplated.

Although applicable to any existing or yet to be developed wireless telecommunications network, aspects of the disclosed architecture are described with reference to the GSM air interface that uses general packet radio service (GPRS) as an enabling bearer for data service. Examples of other suitable wireless and radio frequency data transmission systems include networks utilizing TDMA, frequency division multiple access (FDMA), wideband code division multiple access (WCDMA), orthogonal frequency division multiplexing (OFDM), and various other 2.5G, 3G (third generation) and future generation wireless communications systems. Examples of other suitable systems include universal mobile telecommunications system (UMTS), enhanced data rates for global evolution (EDGE), high speed downlink packet access (HSDPA), and similar communications protocols.

In addition, the present invention is applicable to wireline services, such as cable, DSL, landline telephone service, and the like. Coverage for many wireline services is fixed and does not vary over time thus eliminating the need to adjust parameters associated with wireline services dynamically. Wireline services and/or features can be billed based on a variable resolution cell or service area in accordance with embodiments of the present invention.

The illustrated billing system 102 includes a rating sub-system 108 that is in communication with other billing sub-systems 110. The rating sub-system 108 initiates a billing process according to the present invention. An exemplary billing process is described in further detail with reference to FIG. 2. In addition to data related to aspects of the present invention, the rating sub-system 108 can be configured to store service rates based on traditional billing zone partitioning, such as, area code, zip code, markets, sub-market, and the like. Prior to bill processing, the rating sub-system 108 associates billing data to each subscriber account.

The other billing sub-systems 110 can be configured to acquire billing data from the rating sub-system 108, generate bills, and send the bills to the customers (e.g., electronic or paper). A customer service center for providing customer service for billing matters can also be embodied in the other billing sub-systems 110. Accordingly, a customer care call center, Internet chat facility, and/or email support for customer service inquiries can be embodied in the other billing sub-systems 110.

The rating sub-system 108 communicates with the geographic broker 106 to associate a geographic area to each subscriber. A geographic area can include a cell ID of one or more cells, a location area that includes at least two cells, or other identifier of a service provider's network coverage. It is contemplated that the geographic broker 106 can provide geographic areas on a per subscriber basis. Moreover, the selection of the geographic area or resolution for a particular subscriber is a billing decision that can be changed dynamically depending on variable market conditions, coverage, or any other external situational parameters. The geographical broker 106 can convert traditional location data (e.g., zip codes) into geographic data, such as GPS compatible National Marine Electronics Association (NMEA) codes, for example. Accordingly, the geographic broker 106 and rating sub-system 108 can coordinate to determine the appropriate geographic resolution for the subscriber based upon the market conditions, coverage, and/or parameters associated with the subscriber.

The rating sub-system 108 is also in communication with the service broker 112. The rating sub-system 108 provides the geographic resolution determined for a particular subscriber to the service broker 112. The service broker 112 translates the geographic resolution into a set of cells that aggregate to cells defined in the density maps 116.

The service broker 112 can determine, for each cell aggregate, the appropriate rating structure by accessing the data stored in the adaptive rating criteria engine 114. The rating structure can be defined by the service provider for a particular portion (i.e., number of cells) of a coverage density map 116. Several exemplary rating structures are now described. It should be understood that these are merely exemplary and are by no means exhaustive.

By way of example, additional rating structures could be the result of non-linear optimization under constraints on a particular set of cells based on economic utility. Other rating structures can include: averaging prices across neighboring cells, taking the minimum or the maximum price in a set of cells, a linear combination of these, a barycentric combination of these using the density of populations as weights.

The rating structure can by dynamic or static and can be generated from parameters, such as, population density and coverage density, for example. However, any parameter associated with a cell may be used to generate a rating structure. The examples below assume the example parameters for population density ($d_p$) and coverage density ($d_c$). For both of these parameters the density parameter can be a real number between and including 0 and 1. By way of example and not limitation, a price (P) for services rendered by a service provider can follow an equation: P=f (parameters). Also, a base price ($P_B$) can be used. The $P_B$ can be the base price for a particular market or sub-market. As described earlier, the parameters can be any measurable parameters for a cell; however, for purposes of explanation population density and coverage density are used.

It should be understood that the equations provided below teach a structure and are used to illustrate varying trends for high/low densities as these parameters relate to projected prices for services rendered by a service provider. In practice, however, the actual formulas used can be more or less complex as is needed to establish an appropriate pricing structure for services rendered by a particular service provider.

The following equations can be used to determine the rating price for a subscriber based upon the population density and coverage density.

$$P = P_B \times [(\alpha \times d_p) + (\beta \times d_c)], \text{ where } 0 \leq \alpha \leq 1, 0 \leq \beta \leq 1, 0 \leq d_p \leq 1 \text{ and } 0 \leq d_c \leq 1. \quad \text{(Eq. 1)}$$

$$P = P_B \times [\alpha(1-d_p) + \beta(1-d_c)], \text{ where } 0 \leq \alpha \leq 1, 0 \leq \beta \leq 1, 0 \leq d_p \leq 1 \text{ and } 0 \leq d_c \leq 1. \quad \text{(Eq. 2)}$$

$$P = P_B \times \left[ \alpha \left( \frac{e^{d_p} - 1}{e - 1} \right) + (1 - \alpha) \left( \frac{e^{d_c} - 1}{e - 1} \right) \right],$$

where $0 \leq \alpha \leq 1, 0 \leq d_p \leq 1$ and $0 \leq d_c \leq 1$. (Eq. 3)

For situations in which two base prices are used (i.e., $P_{B1}$ and $P_{B2}$), the following equations can be used to determine the rating price for a subscriber based upon the population density and coverage density. Again, these equations are used merely as examples and not intended to be limiting of the present invention.

$$P = [(P_{B1} \times d_p) + (P_{B2} \times d_c)], \text{ where } 0 \leq d_p \leq 1 \text{ and } 0 \leq d_c \leq 1. \quad \text{(Eq. 4)}$$

$$P = [(P_{B1}(1-d_p) + P_{B2}(1-d_c)], \text{ where } 0 \leq d_p \leq 1 \text{ and } 0 \leq d_c \leq 1. \quad \text{(Eq. 5)}$$

The mapping data acquired from the density maps 116 and the corresponding rating structure(s) is sent to the rating sub-system 108. The rating sub-system 108 uses the rating structure to determine the appropriate rating for each geographic area and then for each customer. This information can then be sent to the other billing sub-system 110, where bills are generated and sent to the customers.

The billing sub-systems described above can be implemented using database management and design techniques. Database tables can easily store any data correspondence described and Online Analytical Processing (OLAP) systems can be used if aggregation optimization is sought. It should be understood, however, that other databases and database management techniques for relational, hierarchical, and network databases may alternatively or additionally be used.

Central to an exemplary embodiment of the present invention is the availability of density maps for features or services offered by a GSM wireless service provider. Currently, GSM maps are computed quarterly by various statistics companies and published by the GSM association (GSMA). Statistics relevant to other technologies can be acquired, and maps can be computed therefrom and published. Updates to the density maps 116 can be provided by a maps updater 118, which can provide version updates to the maps or retrieve new maps. In one implementation, the maps updater 118 can be a software program running on the apparatus 104 to automatically retrieve updates and/or new maps when available. Manual retrieval, for example, by an administrator is also contemplated. Borrowing the GSMA example, these updates would be available approximately on a quarterly basis. It should be understood, however, that updates can occur at any time. For example, updates can be updated in real-time, near real-time, or any time value of seconds, minutes, hours, days, weeks, months, and years.

Figure 2:
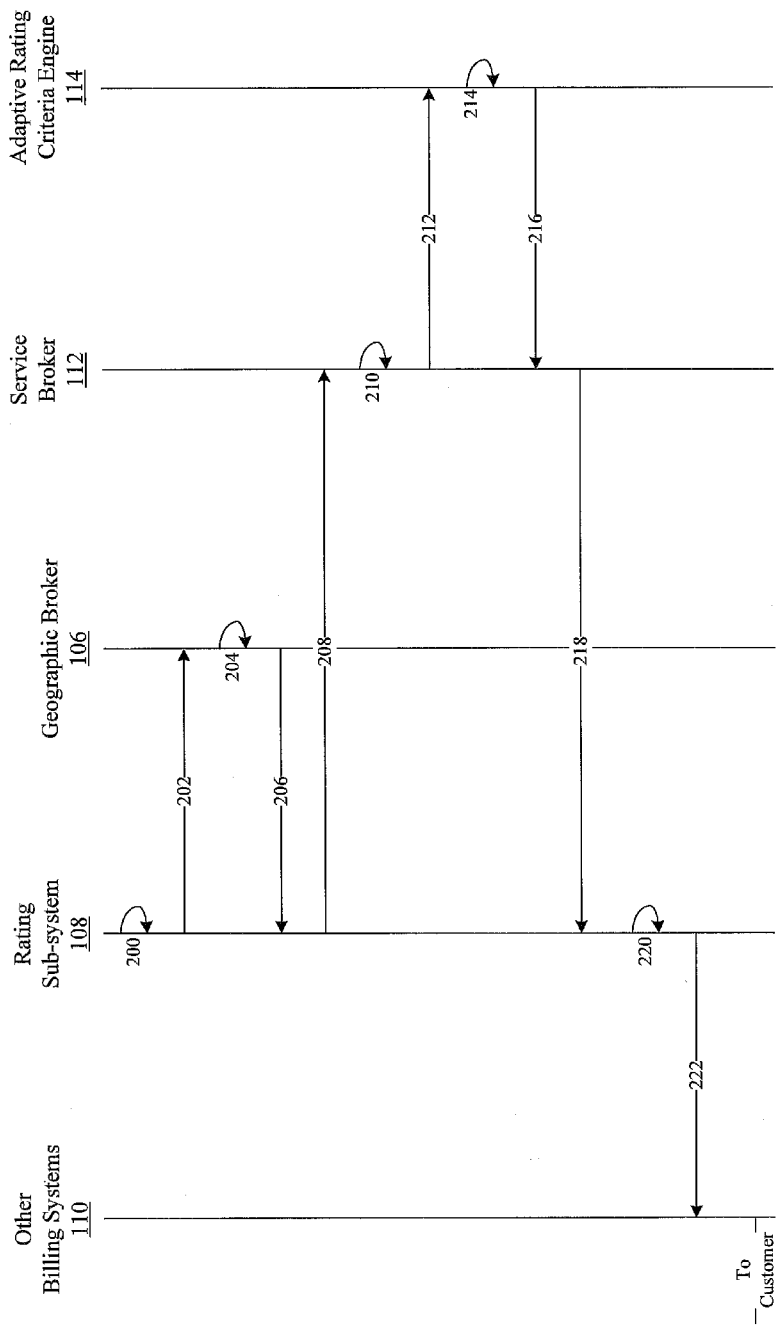
FIG. 2 illustrates an exemplary billing process, according to the present invention.

Referring now to FIG. 2, an exemplary billing process is illustrated, according to the present invention. The billing process begins at the rating sub-system 108 with the association of billing data to a subscriber at step 200. The rating sub-system 108 can then send a request to the geographic broker 106, at step 202. The geographic broker 106 receives the request and determines a cell resolution for the selected subscriber at step 204. As mentioned previously, the cell resolution can be different for each subscriber and can be changed dynamically based upon variable market, coverage, or any external situational parameters.

After the cell resolution is determined, a response is generated by the geographic broker 106 and sent to the rating sub-system 108, at step 206. The rating sub-system 108 receives the response, generates a request, and sends the request to the service broker 112, at step 208. The request includes the cell resolution determined at the geographic broker 106 during step 204. Upon receipt of the request, the service broker 112 translates the cell resolution into a group of cells available in the density maps 116 that aggregate at least approximately to the cells specified in the cell resolution. The service broker also maintains for each aggregate the aggregations routines to use (e.g., minimum, maximum, average, etc.) The cells are matched against the density maps and the aggregations are performed. The above functions are performed by the service broker 112 at step 210. The service broker 112 then sends a request, at step 212, to the adaptive rating criteria engine 114 to determine the appropriate rating structure for the aggregated data. At step 214 the adaptive rating criteria engine 114 receives the request from the service broker 112 and determines the appropriate rating structure for the aggregated data, and generates a response to be sent to the service broker 112. At step 216, the response is sent to the service broker 112. The service broker 112 receives the response and sends the rating structure and the aggregated map data to the rating sub-system 108, at step 218. At step 220, the rating sub-system 108 uses the rating structure to determine the appropriate rating for each cell and each subscriber. The rating information is sent to the other billing systems 110 at step 222 and an appropriate bill is generated and sent to the subscriber.

The functionality of the billing system 102, the apparatus 104, the geographic broker 106, and the related components can be provided by one or more computer program modules. As used herein, the term "module" refers to computer program logic and/or any hardware or circuitry utilized to provide the functionality attributed to the module. Thus, a module can be implemented in hardware, firmware, and/or software.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for billing wireless telecommunications services, the method comprising:
   at a service broker of an apparatus:
      receiving a cell resolution for a subscriber, the cell resolution being determined for a billing period by a geographic broker;
      translating the cell resolution into a set of cells that aggregate at least approximately to cells defined in a density map; and
      sending a request to an adaptive rating criteria engine of the apparatus, the request being for determining a rating structure for said set of cells;
   at the adaptive rating criteria engine:

receiving the request and, in response, determining the rating structure for the set of cells; and sending the rating structure to the service broker of the apparatus;

at the service broker of the apparatus:

receiving the rating structure and, in response, sending the rating structure and the set of cells to a rating sub-system of a billing system that is in communication with the apparatus; and at the rating sub-system of the billing system:

calculating a rating for service rendered to the subscriber based upon the set of cells and the rating structure; and generating a bill reflecting the rating;

wherein the rating structure is an equation comprising a base rating and at least one density parameter used to determine the rating, the density parameter being derived from the density map.

2. The method of claim 1, wherein the cell resolution comprises at least one cell in a Global System for Mobile (GSM) communications network.

3. The method of claim 2, wherein the density map is acquired from the GSM association (GSMA).

4. The method of claim 1, wherein the cell resolution comprises at least one cell in a Universal Mobile Telecommunications System (UMTS) communications network.

5. The method of claim 1, wherein the cell resolution comprises at least one cell in a Code Division Multiple Access (CDMA) network.

6. The method of claim 1, wherein the service is a voice service.

7. The method of claim 1, wherein the service is a data service.

8. A non-transitory computer-readable medium comprising computer-executable instructions that, when executed by a processor, cause the processor to perform acts comprising:

receiving a cell resolution for a subscriber, the cell resolution being determined for a billing period by a geographic broker;

translating the cell resolution into a set of cells that aggregate at least approximately to cells defined in a density map;

determining a rating structure for said set of cells;

sending the set of cells and the rating structure to a rating sub-system of a billing system that is in communication with the apparatus so that the billing system can calculate a rating for service rendered to the subscriber based upon the set of cells and the rating structure, and generate a bill reflecting the rating;

wherein the rating structure is an equation comprising a base rating and at least one density parameter used to determine the rating, the density parameter being derived from the density map.

9. An apparatus for determining rating structures for a subscriber in a wireless telecommunications network, the apparatus comprising:

a service broker; and an adaptive rating criteria engine;

the service broker being configured to:

receive a cell resolution for a subscriber, the cell resolution being determined for a billing period by a geographic broker;

translate the cell resolution into a set of cells that aggregate at least approximately to cells defined in a density map; and send a request to the adaptive rating criteria engine, the request being for determining a rating structure for the set of cells;

the adaptive rating criteria engine being configured to:

receive the request and, in response, determine the rating structure for the set of cells; and send the rating structure to the service broker;

the service broker being further configured to:

receive the rating structure and, in response, send the rating structure and the set of cells to a rating sub-system of a billing system that is in communication with the apparatus so that the billing system can calculate a rating for service rendered to the subscriber based upon the set of cells and the rating structure, and generate a bill reflecting the rating;

wherein the rating structure is an equation comprising a base rating and at least one density parameter used to determine the rating, the density parameter being derived from the density map.

10. The apparatus of claim 9, further comprising a density map database for maintenance and retrieval of the of density map of a plurality of density maps.

11. The apparatus of claim 10, wherein the density map database is capable of receiving updates to at least one of the plurality of density maps and updating at least one of the density maps.

12. The apparatus of claim 9, wherein the adaptive rating criteria engine is further configured to store rating criteria used by the service broker to determine the rating structure appropriate for the set of cells.

13. The apparatus of claim 9, wherein the cell resolution comprises at least one cell in a Global System for Mobile (GSM) communications network.

14. The apparatus of claim 13, wherein the density map is acquired from the GSM association (GSMA).

15. The apparatus of claim 9, wherein the cell resolution comprises at least one cell in a Universal Mobile Telecommunications System (UMTS) communications network.

16. The apparatus of claim 9, wherein the cell resolution comprises at least one cell in a Code Division Multiple Access (CDMA) network.

17. The apparatus of claim 9, wherein the service is a voice service.

18. The apparatus of claim 9, wherein the service is a data service.

* * * * *